(12) United States Patent
Fey

(10) Patent No.: US 8,983,895 B2
(45) Date of Patent: Mar. 17, 2015

(54) REPRESENTATION OF MULTIPLICITIES FOR DOCFLOW REPORTING

(75) Inventor: Harald Fey, Illingen (DE)

(73) Assignee: SAP SE, Walldorf (DE)

( * ) Notice: Subject to any disclaimer, the term of this patent is extended or adjusted under 35 U.S.C. 154(b) by 578 days.

(21) Appl. No.: 11/648,843

(22) Filed: Dec. 29, 2006

(65) Prior Publication Data
US 2008/0162550 A1 Jul. 3, 2008

(51) Int. Cl.
*G06F 17/00* (2006.01)
*G06F 17/30* (2006.01)
*G06F 7/00* (2006.01)

(52) U.S. Cl.
CPC ............................ *G06F 17/30592* (2013.01)
USPC ............ 707/600; 707/607; 707/797; 707/798

(58) Field of Classification Search
USPC ........... 707/1–7, 10, 100–103, 200, 205, 600, 707/797, 798, 958
See application file for complete search history.

(56) References Cited

U.S. PATENT DOCUMENTS

| 5,357,631 | A * | 10/1994 | Howell et al. ................. 707/203 |
| 5,870,552 | A * | 2/1999 | Dozier et al. ................. 709/219 |
| 6,263,301 | B1 * | 7/2001 | Cox et al. ........................ 703/14 |
| 6,278,977 | B1 * | 8/2001 | Agrawal et al. .................... 705/7 |
| 2003/0217033 | A1 * | 11/2003 | Sandler et al. .................... 707/1 |
| 2005/0120051 | A1 * | 6/2005 | Danner et al. ............. 707/104.1 |
| 2007/0299547 | A1 * | 12/2007 | Bier ............................... 700/17 |

OTHER PUBLICATIONS

OLTP vs. OLAP, Sep 20, 2008, datawarehouse4u.info.*
Transforming OLTP Data to OLAP DataWarehouses, Feb 1, 2001, MSDN, msdn.microsoft.com.*

* cited by examiner

*Primary Examiner* — Usmaan Saeed
*Assistant Examiner* — Yu Zhao
(74) *Attorney, Agent, or Firm* — Brake Hughes Bellermann LLP

(57) ABSTRACT

A method and system for representing and deducing a multiplicity of predecessor relationships between a plurality of first objects and a second object in an OLAP system comprises configuring an extraction system to extract information for a plurality of sub-objects of the first and second objects and using the extracted information to deduce predecessor relationships between the first objects and the second object.

14 Claims, 9 Drawing Sheets

REPRESENTATION OF MULTIPLICITIES FOR DOCFLOW REPORTING

TECHNICAL FIELD

This description relates to computer software. In particular, this description relates to a method and system for representing multiplicities in an OLAP ("Online Analytics Processing") system.

BACKGROUND

Modern businesses rely upon a myriad of operational systems that generate data. Examples of operational systems may include order generation systems, invoicing systems, billing systems and accounting systems. It is often desirable to store data generated by an online transaction processing ("OLTP") system or an operational system for later analysis. For example, it may be desirable to store data for transactions generated in an OLTP system. At some later point in time, this data may be analyzed to examine customer trends, preferences, revenue generated by category, or other relevant business data. Data visualization tools such as charting and plotting may be employed to provide additional insight into the content of the data. Systems that are utilized to store data generated from operational systems are often referred to as OLAP systems, which may include business warehouse ("BW") systems or business intelligence ("BI") systems.

The process of performing the transfer of data from an OLTP system to an OLAP e.g., BW, system is often referred to as an extraction process. The term "extraction" describes the concept of retrieving data from an operational system and causing the storage of the extracted data in an OLAP system. An extraction system may be deployed, which upon the generation of data in an OLTP system, automatically transfers the generated data from an OLTP system to the OLAP system. The extraction process may also perform some rudimentary transformations on the data before it is stored in the OLAP system in order that the data is in a form suitable for processing and storage by an OLAP system. An extraction system may be part of an operational system such as a framework implemented within an operational system or may be a separate system.

Data may be stored in an OLAP system in a very different format than the way data is represented in an OLTP system. This difference may be necessitated by efficiency requirements for enabling analytic processing that will later be performed on data. The data is stored in the OLAP system in a manner that provides for efficient access and storage of the data and facilitates analytical processing performed on the data.

In business systems it is often desirable to track what is commonly referred to as document flow ("Docflow"). Docflow relates to the actual business documents that are typically generated over the life cycle of a business transaction. For example, the evolution of a sales transaction may include the following generally sequential steps: campaign, lead, opportunity, quotation, sales order and invoice. Each of these steps may be associated with corresponding documents, document types, templates, or other recordings of occurrences associated with a particular step of a business transaction. At least some of the steps may generally proceed in a sequence, e.g., a sales campaign may lead to multiple leads, some of which may lead to corresponding opportunities, and some of these may result in providing a quotation. Of course, a campaign may spread over a period of time and may be considered to encompass some or all of the other steps, and the steps may proceed in an iterative or recursive manner, as well (e.g., when a quotation is initially turned down, a revised quotation is accepted, and a sales order ensues).

There may exist multiple predecessor documents for a single successor document, or multiple successor documents for a single predecessor document. This situation may be referred to as "multiplicities". The term "multiplicities" refers to the situation in which multiple documents are related to or associated with any one document. A multiplicities situation may be represented by the symbols "1:n" to indicate that a single document is associated or related to an arbitrary number (n) of other documents. The relations may include such ontological concepts as "preceding" or "succeeding" or "has a". For example, there may exist several quotations that precede a single sales order.

The OLAP model requires attributes to be single valued. In order to take account of multiplicities, the multiplicities must be modeled in a specific manner. Thus, it is not possible to represent multiple predecessor documents for a single successor document in a reasonable and efficient manner (without introducing other disadvantages). This limitation may arise, for example, due to a requirement that fields in an OLAP system often must be single valued. That is, the data in any given field must be unique. For example, the star system used to represent data in an OLAP system, may prohibit multiple valued fields.

Thus, the requirements of OLAP storage formats thus impose limitations on adequately representing, analyzing and reporting DocFlow or other data management scenarios that may involve multiplicities. These multiplicities may manifest as multiple predecessor documents for a single successor document, multiple successors for a single predecessor document or some other multitude of documents associated with a single document (1:n). Without accurate representation of multiplicities of DocFlow in an OLAP system, analytics reporting functions may produce incorrect results. For example, if a number of quotations preceded a sales order, but only some subset (or one) of these quotations may be represented in an OLAP storage format, then analytics regarding quotations relative to sales orders may be inaccurate or incomplete. Thus, it may be difficult to provide for the storage of data in an OLAP system in a manner compatible with the requirements of an OLAP system while at the same time allowing for the accurate representation, analysis and reporting of multiplicities that may arise in DocFlow or similar applications.

SUMMARY

According to one general aspect a method for representing a multiplicity of predecessor relationships between a plurality of first objects and a second object in an OLAP system comprises configuring an extraction system to extract first information for a plurality of third objects, the first information indicating a sub-object relation between each of the third objects and one of the first objects, configuring the extraction system to extract second information for a plurality of fourth objects, the second information indicating a sub-object relation between each of the fourth objects and the second object, configuring the extraction system to extract third information, the third information indicating a predecessor relation between each of a plurality of the third objects and each of a plurality of the fourth objects, and performing an extraction process based on the configuration of the extraction system.

According to another general aspect, a system for representing a multiplicity of predecessor relationships between a plurality of first objects and a second object in an OLAP system comprises a processor configured to configure an extraction system to extract first information for a plurality of third objects, the first information indicating a sub-object relation between each of the third objects and one of the first objects, configure the extraction system to extract second information for a plurality of fourth objects, the second information indicating a sub-object relation between each of the fourth objects and the second object, configure the extraction system to extract third information, the third information indicating a predecessor relation between each of a plurality of the third objects and at each of a plurality of the fourth objects, and perform an extraction process based on the configuration of the extraction system.

According to another general aspect a method for deducing a plurality of predecessor relationships between a plurality of first objects and a second object comprises determining a plurality of sub-object relations between each of a plurality of third objects and each of the first objects, determining a sub-object relation between each of a plurality of fourth objects and the second object, determining a predecessor relation between each of a plurality of the third objects and each of a plurality of the fourth objects, and deducing a plurality of predecessor relationships between the first objects and the second object based upon the sub-object relations between the third and first objects, the sub-object relation between the fourth objects and second object and the predecessor relation between the third objects and fourth objects.

According to another general aspect a system comprises a relation extractor configured to extract first information for a plurality of first objects, the first information indicating a sub-object relation between each of the first objects and one of a second object, extract second information for a plurality of third objects, the second information indicating a sub-object relation between each of the third objects and a fourth object, extract third information, the third information indicating a predecessor relation between each of a plurality of the third objects and each of a plurality of the first objects, initiate an extraction process based on the configuration of the extraction system, a sequence deduction unit configured to determine a plurality of sub-object relations between each of the first objects and at least one of the second objects based upon the first information, determine a sub-object relation between each of the third objects and the fourth object based upon the second information, determine a predecessor relation between each of a plurality of the third objects and each of a plurality of the first objects using the third information, and deduce a plurality of predecessor relationships between the second objects and the fourth object based upon the first, second and third information.

The details of one or more implementations are set forth in the accompanying drawings and the description below. Other features will be apparent from the description and drawings, and from the claims.

DETAILED DESCRIPTION

Figure 1A:
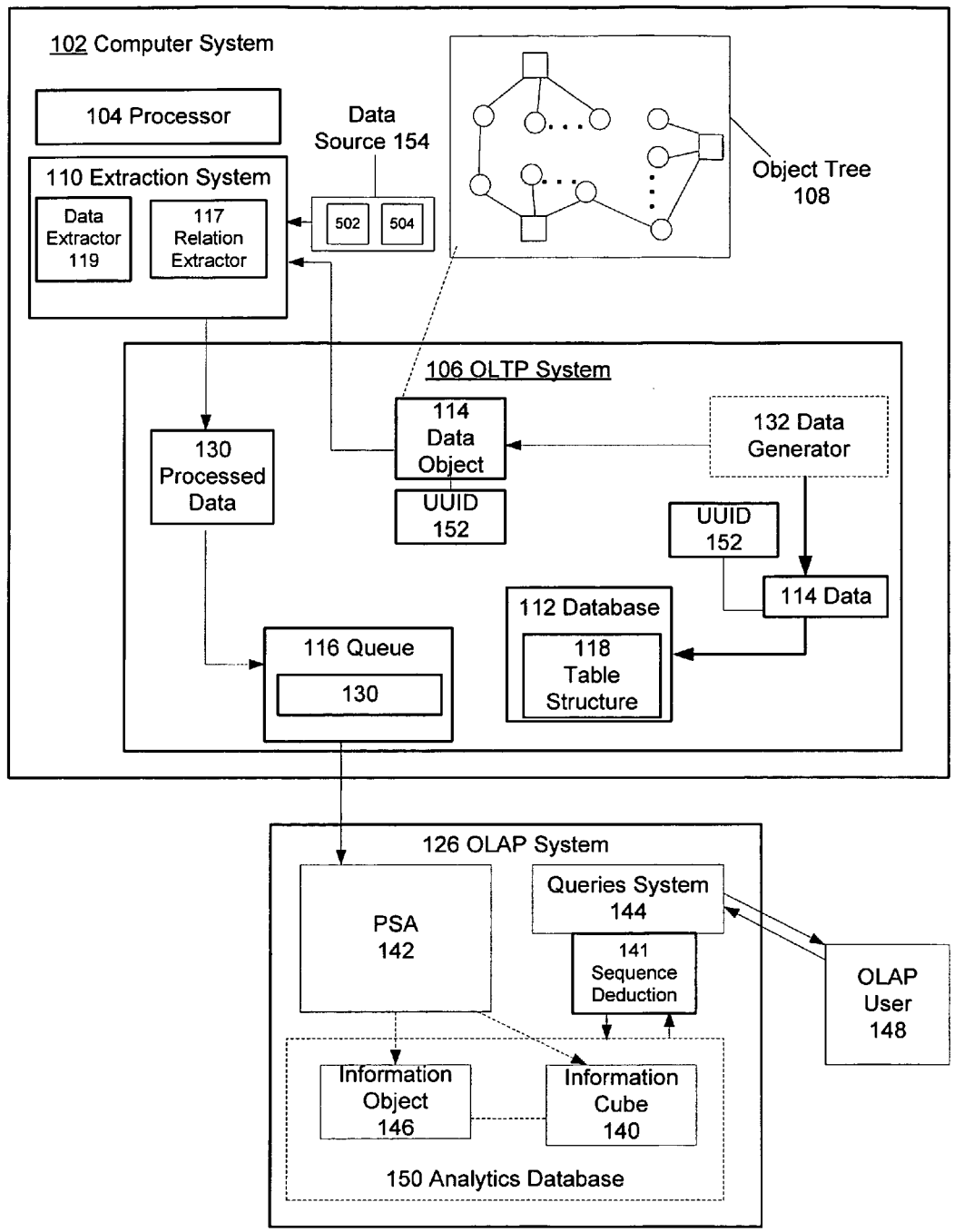
FIG. 1A is a block diagram of an example operation of a data extraction system in conjunction with an operational system and an OLAP system.

FIG. 1 is a block diagram of an example operation of a data extraction system in conjunction with an operational system and an OLAP system. In the example of FIG. 1, a computer system 102 may include a processor 104 that executes any number of processes. The computer system 102 may provide an OLTP system 106 or other operational system, as well as an extraction system 110. It should be understood that these various systems 102, 104, 106 may be comprised of various hardware and software elements. For example, an OLTP system 106 may include the hardware of the computer system itself 102 as well as various processes executed by a processor 104 to provide functions related to the OLTP system 106. Although various processes may be executed on a single computer system 102 sharing a single processor 104 and memory system (not shown), it should be understood that these processes may execute on multiple computer systems and/or may be implemented using dedicated hardware.

An OLTP system 106 may perform functions related to a business operation such as order generation, inventory management and accounting. Although FIG. 1 shows a single OLTP system 106, it should be understood that the computer system 102 may host any number of OLTP system processes 106 for performing heterogeneous business functions.

An OLTP system 106 may include any number of data generators 132. A data generator 132 may be any output of the OLTP system 106 that generates or provides data 114. Although only a single data generator 132 is shown for the OLTP system 106, it should be understood that an OLTP system 106 may include any number of data generators 132, which generate data objects 114.

Typically data objects 114 may comprise any number of fields or discrete elements. Thus, for example, an order generation system might include a data generator 132 that generates order record objects. The order record objects might comprise a number of data fields including an order record identifier, a date, a buyer name, etc.

Each data object 114 may be associated with a UUID ("Universal Unique Identifier") 152 that distinguishes the data object. A UUID 152 is guaranteed or extremely likely to be different from any other generated UUID 152. Thus, for example, in the example of an order object may be associated with various items or entries, which may also be objects in a "has a" relation. In this case, the order itself as well as the individual items associated with the order via the "has a"

relation may each be associated with a respective UUID 152. Each of the UUIDs 152 will be different from each other so as to uniquely identify each item associated with the sales order.

Data objects 114 may be organized into an object tree 108. An object tree 108 may store structured objects in a tree structure. The tree structure may represent a plurality of objects and relations among the objects. For example, a sales order object might be associated with one or more item objects via a "has a" relation. Thus, the object tree 108 might include the sales order object, a separate object for each item associated with the sales order and a data structure that represents the relations between the sales order object and each item object (in this case the relation would be "has a").

In another example, a document such as a quotation might precede a sales order. In this case, the object tree 108 might include a quotation object and a sales order object. A separate data structure might then represent the relation that the quotation order object precedes the sales order object. An exemplary object tree 108 is described with reference to FIG. 3A and a specific example showing items and documents is described with reference to FIG. 3B. An exemplary data structure for representing an object tree 108 is described with reference to FIG. 4.

An OLTP system 106 may cause the data object 114 generated by a data generator 132 to be stored in an OLTP system database 112. An OLTP system database 112 may be a relational database with a predefined table structure. The predefined table structure may correspond to the structure of data objects generated by the data generator 132. Thus, for example, in the order record object example, the database 112 may include a table structure that includes fields for an order record identifier, a data, a buyer name, etc. As shown in FIG. 1, data objects 114 generated by data generator 132 may be stored in an OLTP system database 112 along with an associated UUID 152 for the data object 114.

FIG. 1A also shows an extraction system 110. An extraction system 110 may perform processes in tandem with an OLTP system 106 to transfer and process data 114 generated by any number of data generators 132 in an OLTP system 106 into a format suitable for consumption by an OLAP system 126. An extraction system 110 may perform various evaluation and transformation functions to process data objects 114 generated by a data generator 132 before they are stored in the OLAP system 126. These transformations may prepare the data in a format suitable for analytic evaluation and/or storage in the OLAP system 126 and may include such functions as data aggregation, data combination, data filtering, data conversion and any other type of processing. Although as shown in FIG. 1A, the extraction system 110 is shown as executing on the same processor as the OLTP system 106, it should be understood that an extraction system 110 may be executed on a separate processor (not shown in FIG. A).

As shown in FIG. 1A, a process of the extraction system 110 may pull data objects 114 generated from a data generator 132, process and/or transform the data objects 114 via a data source 154 to generate processed data 130 and then cause the storage of the processed data 130 in a queue 116. The processed data 130 stored in the queue 116 may then be transferred to the OLAP system 126.

The extraction system 110 may include a data extractor 119 that performs extraction of particular data fields for a data object 114. An extraction system 110 may also include a relation extractor 114 that performs extraction of relation information associated with objects 114. Relations information may include "has a", "precedes", "succeeds" or any other relation desired.

Before data can be extracted from an OLTP system 106, it may be necessary to configure the extraction system 110 to indicate which data is to be extracted from the OLTP system 106. The configuration of the extraction system 110 may include specifying to the data extractor 119 which fields for particular data objects 114 are to be extracted as well as some rudimentary transformations to be performed on the data objects 114 into a suitable format for consumption by the OLAP system 126. The configuration of the extraction system 110 may also include specifying to the relation extractor 117 which relations among data objects are to be extracted.

This configuration of an extraction system 110 may be stored using a data source 154. A data source 154 may comprise a function module 502 and a specified extraction structure 504, which collectively provide for the transformation and processing of data objects 114 into a format suitable for reception by an OLAP system 126. An extraction structure may include any data indicating or specifying which fields for particular data objects 114 are to be extracted and how the data is to be transformed from its form as generated by a data generator 132 in an OLTP system 160 into processed data 130 suitable for consumption by an OLAP system 126. A data source 154 may include a function module, which utilizes an associated extract structure to perform the transformation of data 114 into processed data 130. A data source 154 may be associated with any number of OLAP systems 126. In particular, it may be desirable to store data generated by an OLTP system 106 in any number of separate OLAP systems 126.

An OLAP system may include a PSA ("Persistency Staging Area") 142, queries function module 144 and an analytics database 150. Because an analytics database 150 may store data in a different format from that of an OLTP system database 112 due to the nature of analytics processing and analysis, typically an OLAP system 126 will cause the transformation of received processed data 130 into a format suitable for the OLAP system 126. A PSA 142 may function to transform and package processed data 130 into a suitable format for storage in an OLAP system 126.

As shown in FIG. 1A, an analytics database 150 may store any number of information objects 146 and information cubes 140. An information object may include a table structure similar to the table structure of an OLTP system database 112. An information cube 140 may provide metadata for navigating and accessing information objects. Thus, before data 130 is stored in an analytics database 150 it must first be further processed and transformed in order that the data is in a format suitable for storage as information objects 146 and information cubes 140.

An OLAP user desiring to perform analysis of data stored in an analytics database 150 may provide queries to queries system 144, which may then cause retrieval of data from the analytics database 150 and associated reporting. In particular, queries system 144 may receive queries (not shown) from an OLAP user 148 and pass the queries on to sequence deduction unit 141. Sequence deduction unit 141 may parse the queries and format the queries in a particular manner, described in more detail, below, in order to facilitate analysis of multiplicities before providing the queries to analytics database 150. Information related to a query provided by an OLAP user may then be provided from analytics database 150 to sequence deduction unit 141. Sequence deduction unit 141 may utilize the information provided by analytics database 150 to deduce multiplicities information between and among objects. This information may then be represented back to the OLAP user 148 via the queries system 144.

Figure 1B:
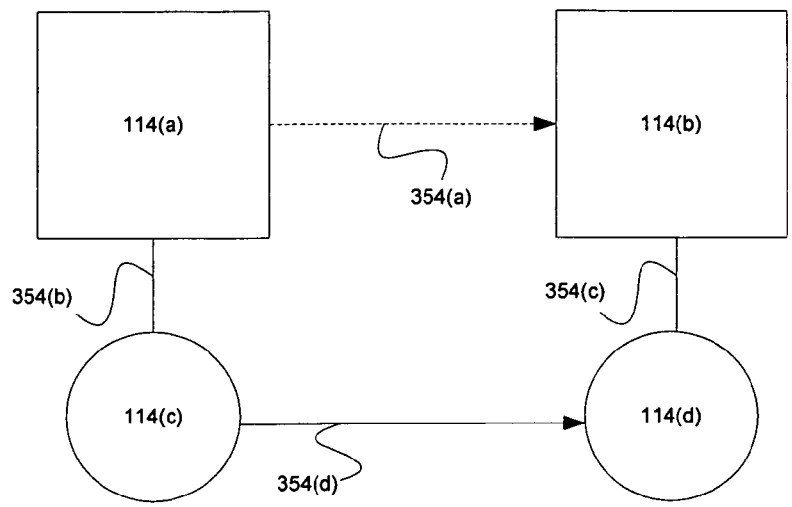
FIG. 1B illustrates an ontological relationship between a set of objects that may be used to deduce predecessor/successor relations between two objects.

FIG. 1B illustrates an ontological relationship between a set of objects that may be used to deduce predecessor/successor relations between two objects. Object 114(a) is a predecessor of object 114(b) via predecessor relation 354(a). It is assumed for purposes of this example that predecessor relation 354(a) between objects 114(a) and 114(b) has not yet been established as represented by the dotted line.

Object 114(c) is a sub-object of object 114(a) via sub-object relation 354(b). Similarly object 114(d) is a sub-object of object 114(b). A sub-object may be any object that is included, part of or nested within another object. An object/sub-object relation may also be represented by the conception that one object "has a" sub-object. For example, a quotation document, a sales order document, and an invoice may have items. Thus, an item may be viewed as a sub-object of both an invoice and a sales order. Finally, object 114(c) is a predecessor of object 114(d) via relation 354(d).

By virtue of the object/sub-object relations between object 114(c)/114(a) and 114(d)/114(b) and the predecessor relation between objects 114(c)/114(d), relation 354(a) may be deduced to be a predecessor relation between object 354(a) and object 354(b). This predecessor relation may be deduced by a sequence deduction unit 141 in an OLAP system.

Figure 2A:
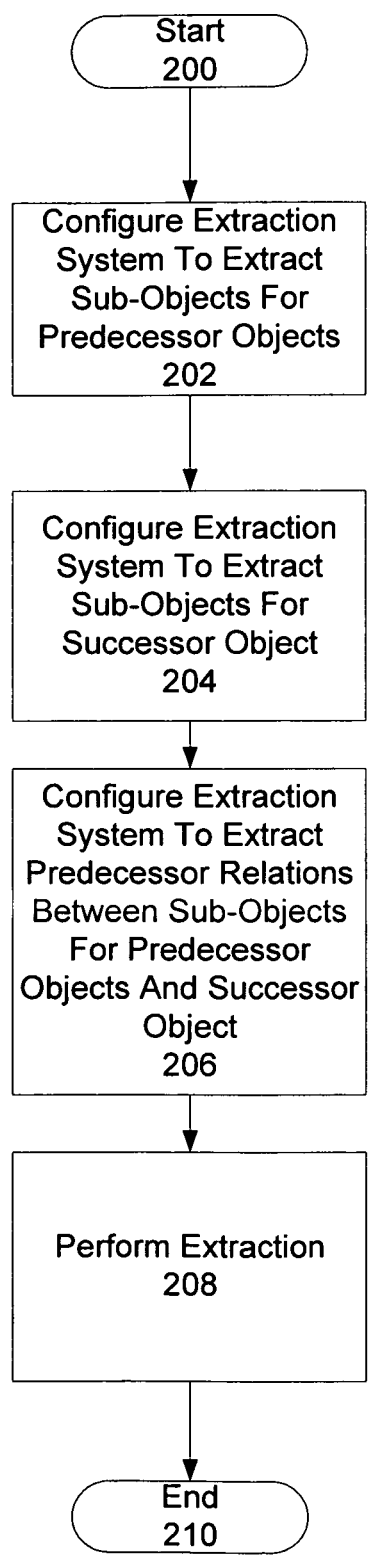
FIG. 2A is a flowchart that depicts a process for representing multiplicities for objects generated in an OLTP system in an OLAP system.

FIG. 2A is a flowchart that depicts a process for representing multiplicities for objects generated in an OLTP system in an OLAP system. It is assumed that an OLTP system has generated multiple predecessor objects for a single successor object. The process is initiated in step 200. In step 202, an extraction system 110 may be configured to extract information for sub-objects of each of the predecessor objects (e.g., see FIG. 1B, 114(a)). This information may correspond to the content of the sub-object as well as the relation information between the first object and the sub-object (i.e., that the sub-object is in fact a sub-object of a predecessor object). In step 204, the extraction system 110 may be configured to extract information for sub-objects of a successor object (e.g., see FIG. 1B, 114(b)). This information may correspond to the content of the sub-object as well as the relation information between the object and the sub-object (i.e., that the sub-object is in fact a sub-object of the successor object). In step 206, the extraction system 110 may be configured to extract predecessor relations information for the sub-objects extracted in steps 202 and 204, i.e., that particular sub-objects are predecessors of other sub-objects.

In step 208, the extraction is performed. The process ends in step 210. The information extracted via steps 202, 204 and 206 represents multiple predecessor relations between the first objects and the second objects. The multiple predecessor relations may be deduced from this information as described below with respect to FIG. 2B. The extraction system 110 may be configured to automatically perform the extraction at a predetermined time or at predetermined intervals of time.

Figure 2B:
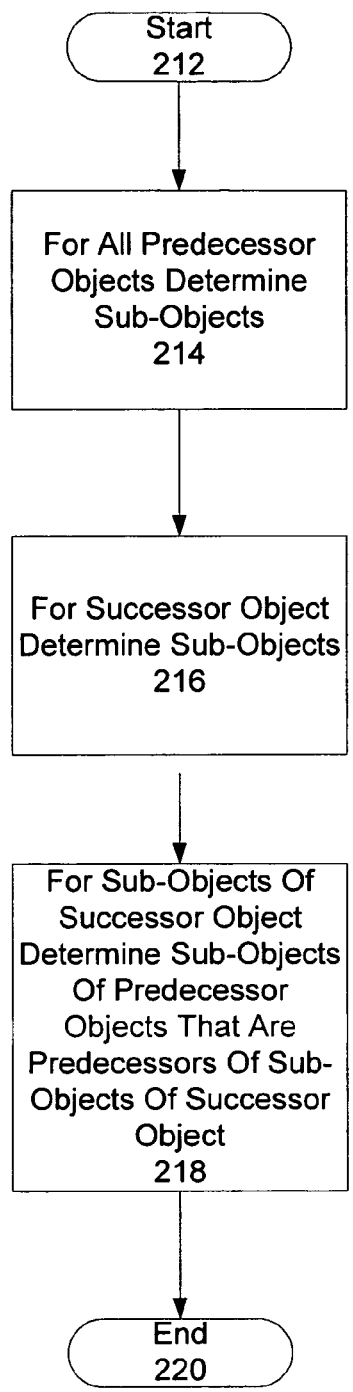
FIG. 2B is a flowchart for a process for deducing multiple predecessor relations between a plurality of first objects and a second object using information extracted to an OLAP system.

FIG. 2B is a flowchart for a process for deducing multiple predecessor relations between a plurality of first objects and a second object using information extracted to an OLAP system. It is assumed that the steps shown in FIG. 2A have been performed and an OLAP system stores sub-objects for a plurality of first predecessor objects, sub-objects for a successor object and a plurality of predecessor relations between the sub-objects. The process shown in FIG. 2B may be performed by a sequence deduction unit in 141 in an OLAP system 126.

The process is initiated in step 212. In step 214, sub-objects for all predecessor objects are determined. In step 216, sub-objects of the successor object are determined. In step 218, sub-objects of the first object that are predecessors of sub-objects of the second object are determined. The first objects may now be deduced to be predecessors of the second object. The process ends in step 220.

Figure 3A:
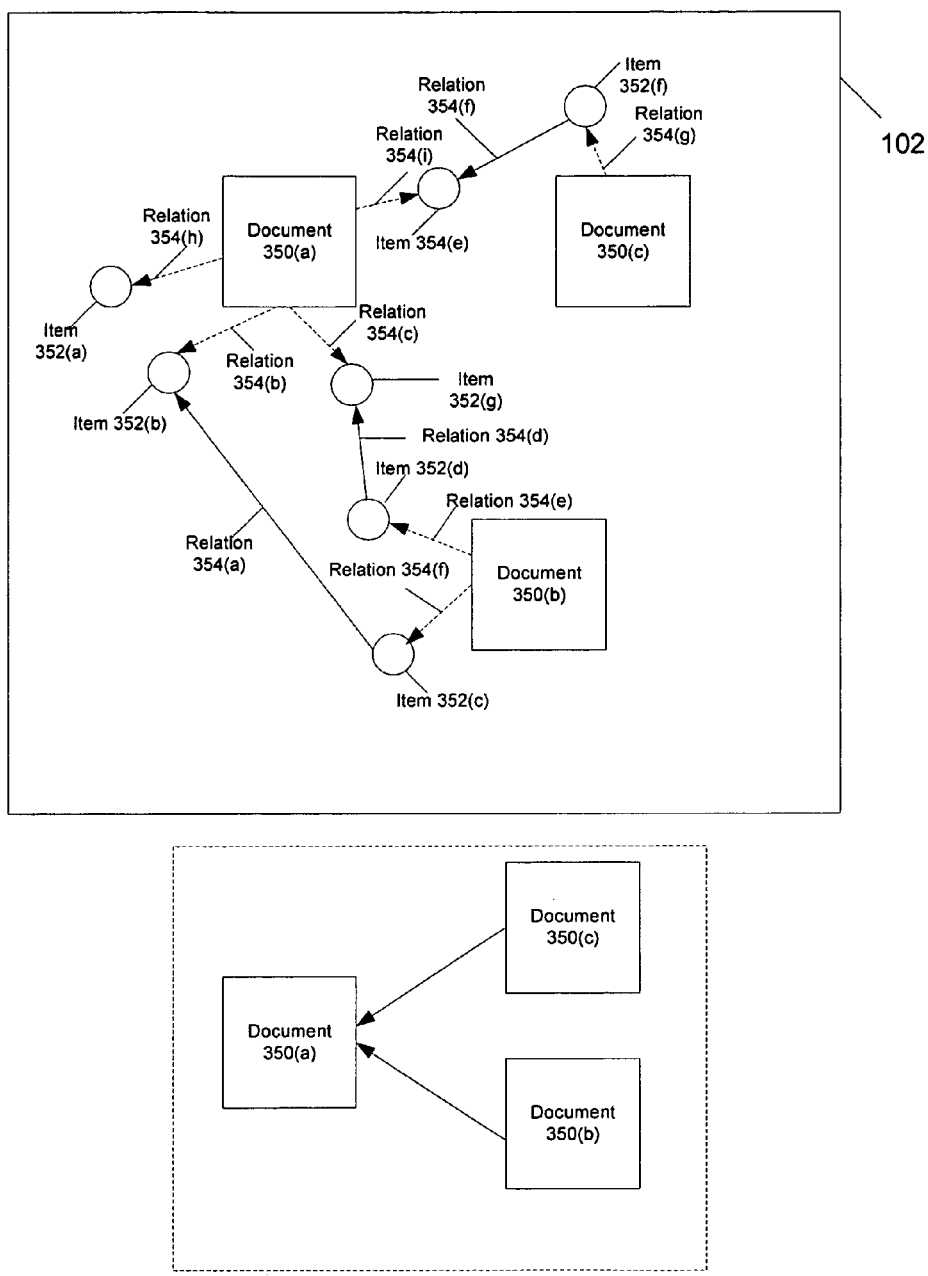
FIG. 3A is a block diagram illustrating an exemplary portion of a document tree including a plurality of documents, items and relations.

Objects 114 may comprise documents in a DocFlow. Items may also be another type of object 114, which may be sub-objects of document objects. FIG. 3A shows an exemplary portion of a document tree including a plurality of documents, items and relations. FIG. 3A further illustrates how the ontological relations shown in FIG. 2C may be utilized to deduce multiple predecessor relations between documents. It is assumed for purposes of this example that documents 350(b) and 350(c) are both predecessor documents of document 350(a). This predecessor relations may be deduced via predecessor relations of items associated with documents 350(a), 350(b) and 350(c) as described below.

In particular, as shown in FIG. 3A, the object tree 102 includes documents 350(a), 350(b) and 350(c). Document 350(a) is associated with items 352(a), 352(b), 352(e) and 352(g) respectively via relations 354(h), 354(b), 354(c) and 354(i), which may be "has a" relations. Document 350(b) is associated with items 352(c) and 352(d) respectively via relations 354(e) and 354(f), which may be "has a" relations. Document 350(c) is associated with item 352(f) via relation 354(g), which may be a "has a relation". As noted earlier, "has a" relations may represent that items 352 are sub-objects of documents.

Items 352(b) and 352(c) are associated via relation 354(a), which indicates that item 352(c) is a predecessor item (sub-object) of item 352(b). Items 352(d) and 352(g) are associated via relation 354(d), which indicates that item 352(d) is a predecessor to item 352(g). Items 352(e) and 352(f) are associated via relation 354(f), which indicates that item 352(f) is a predecessor to item 354(i).

Thus, based on the portion of the object tree 102 shown in FIG. 3A, it may be deduced that documents 350(b) and 350(c) are both predecessors to document 350(a). The deduction that document 350(b) is a predecessor to document 350(a) may be achieved by determining that item 352(d) is a predecessor to item 352(g) while document 350(b) has item 352(d) while document 350(a) has item 352(g). Similarly, the deduction that document 350(c) is also a predecessor to document 350(a) may be achieved by determining that item 354(f) is a predecessor to item 354(e) and document 350(c) has item 354(f) while document 350(a) has item 355(e).

Figure 3B:
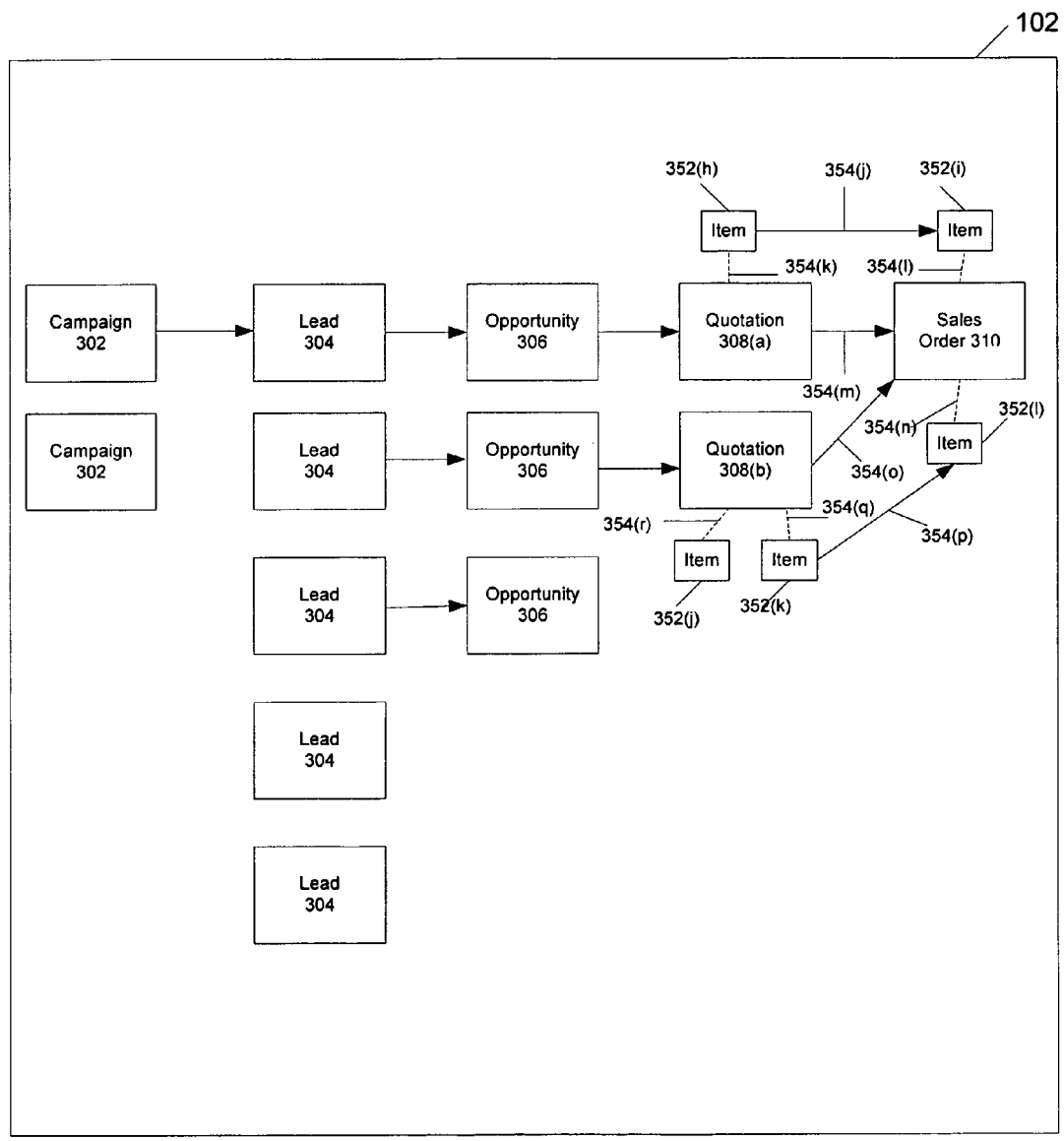
FIG. 3B is a block diagram illustrating a plurality of documents that are related via predecessor/successor relations, including campaign documents, lead documents, opportunity documents, quotation documents and sales order documents that are related via predecessor/successor relations.

FIG. 3B shows a plurality of documents that may be generated in a DocFlow including campaign documents, lead documents, opportunity documents, quotation documents and sales order documents that are related via predecessor/successor relations. The documents shown in FIG. 3B may be part of a DocFlow generated by an OLTP system 106. In particular, quotations 308(a) and 308(b) are multiple predecessors of sales order 310 shown schematically via respective relations 354(m) and 354(o). However, both relations 354(m) and 354(o) typically cannot simultaneously be represented in an OLAP system due to the fact that relations must be single valued. However, item 352(h) is associated with quotation 308(a) via relation 354(k). Sales order 310 is associated with item 352(i) via relation 354(l). Furthermore, item 352(i) is associated with item 352(h) via relation 354(j). Thus, implicitly quotation 308(a) may be seen to be a predecessor of sales order 310 via items 352(h), 352(i) and relations 354(j), 354(k) and 354(l).

Meanwhile, item 352(k) is associated with quotation 308(b) via relation 354(q). Item 352(l) is associated with sales order 310 via relation 354(n). And item 352(1) is associated with item 352(k) via relation 354(p). Thus, implicitly quotation 308(b) may also be seen to be a predecessor of sales order 310 via items 352(k), 352(l) and relations 354(q), 354(p) and 354(n).

Thus, as shown in FIG. 3B multiplicities in predecessor relations between sales order 310 and quotations 308(a) and 308(b) may be represented in an OLAP system, and then deduced using the sub-object (e.g., item) information which otherwise would not be possible otherwise using only information extracted for documents 308(a), 308(b) and 308(c) due to the single value requirement typical of OLAP systems).

Figure 4:
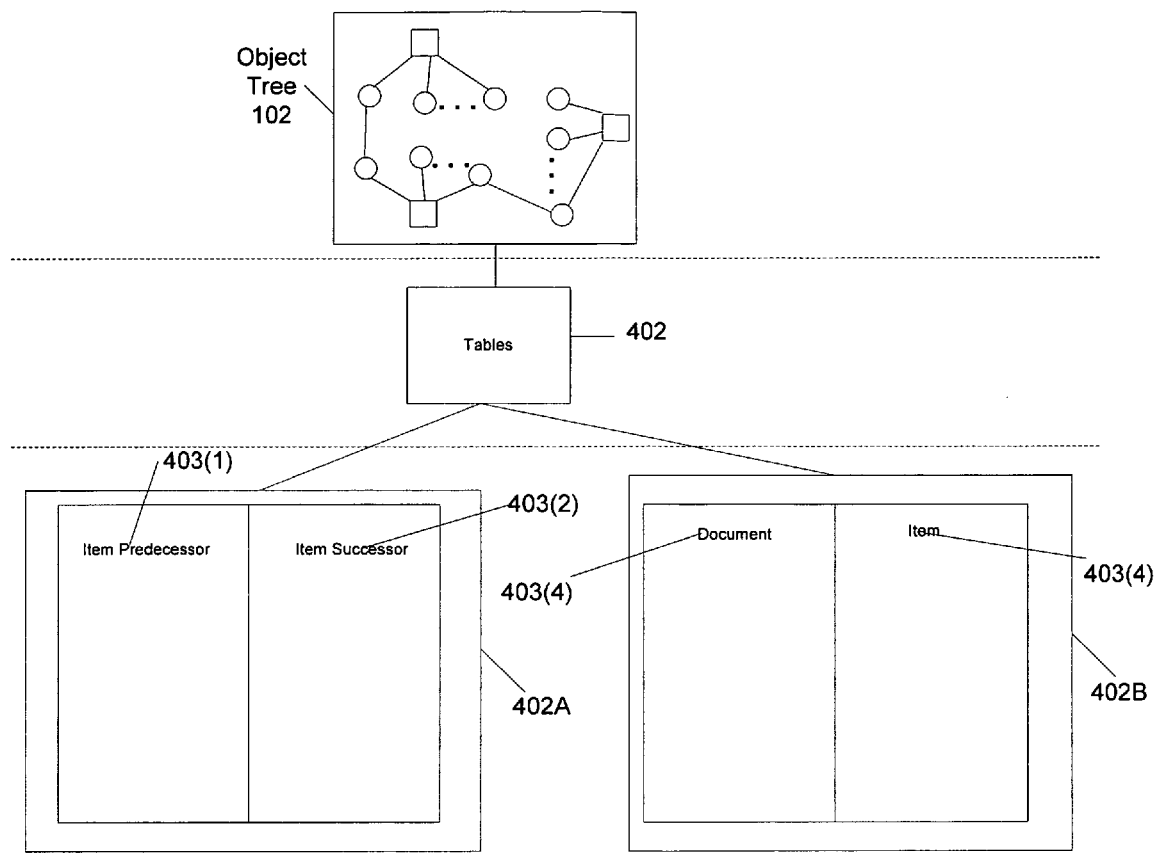
FIG. 4 is a block diagram illustrating an example data structure for representing an object tree.

FIG. 4 shows a data structure for representing an object tree. The data structure shown in FIG. 4 may be utilized, for example, in an OLTP system to represent an object tree 102. An object tree 102 may be represented by a set of tables 402. The tables 402 may be used to indicate relations between and among entities. For example, FIG. 4 shows two exemplary tables to represent a "has a" relationship between a document and an item and a predecessor/successor relationship between a first item and a second item.

Table 402A may be used to represent a predecessor/successor relationship between a first item and a second item. Table 402A includes an item predecessor field 403(1) and an item successor field 403(2). These fields might be populated with corresponding UUIDs 152 for items that exist in a predecessor/successor relationship.

Table 402B may be used to represent a "has a" relationship between a document and an item. Table 402B includes a document field 403(4) and an item field 403(5). Document field 403(4) might be populated with UUIDs 152 corresponding to particular documents, while item field 403(5) might be populated with UUIDs 152 corresponding to particular items that are associated with a particular document.

The table structures shown in FIG. 4 used to represent an object tree 102 may be used to extract "has a" relations information between documents and items and successor/predecessor relations between items. This extracted information may then be used to reconstruct multiplicities in predecessor/successor relations between documents in an OLAP system. Particular fields in tables representing an object tree 102 may be specified to an extraction system 110 in order to cause the extraction system to perform the extraction of the desired information.

Figure 5:
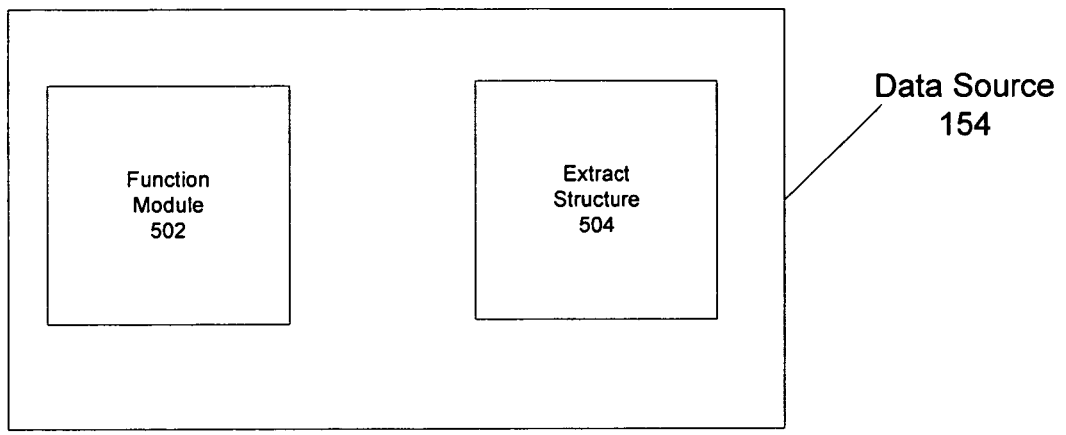
FIG. 5 shows a structure of an example data source according to one embodiment.

FIG. 5 shows the structure of a data source according to one embodiment. A data source 132 may include a function module 502 and an extract structure 504. The function module 502 and extract structure 504 may specify how data generated by a data generator 132 in an OLTP system 106 is to be transformed for extraction for storage in a queue 116. For example, the data source 132 may specify that certain data is to be aggregated, transformed or filtered in a particular way before it is provided to the OLAP system 126.

Figure 6:
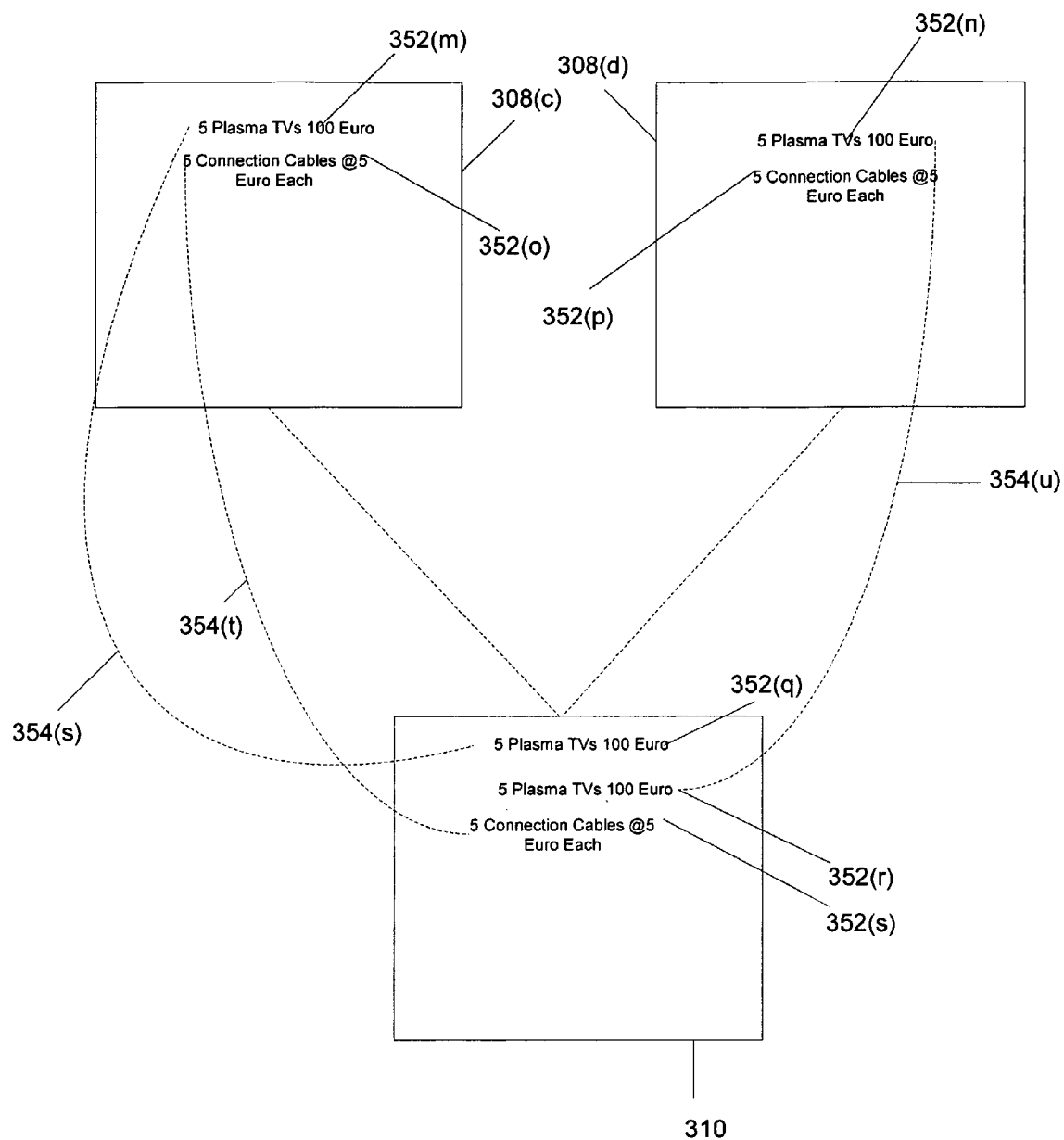
FIG. 6 illustrates an exemplary representation of multiplicities between two quotations and a sales order utilizing extracted successor relations between items associated with two quotations and a sales order.

FIG. 6 illustrates an exemplary representation of multiple quotations succeeding a single sales order utilizing extracted successor relations between items associated with the quotations and sales order. As shown in FIG. 6, a first quotation 308(c) has items "5 Plasma TV's @ 100 Euro" 352(m) and "5 Connection Cables @5 Euro Each" 352(o). A second sales order 308(d) has item "5 Plasma TVs @100 Euro" 352(n) and "5 Connection Cables @ 5 Euro Each" 352(p). Sales order 310 has items item "5 Plasma Tvs @1100 Euros" 352(q), "5 Plasma Tvs @ 100 Euro" 352(r) and "5 Connection Cables @ 5 Euros Each" 352(s). Item 352(r) is a successor to item 352(n) via relation 354(u). Also, item 352(q) is a successor to item 352(m) via relation 354(s). Thus, using the predecessor/successor relations between items 352(r) and 352(n) and items 352(s) and 352(m), the fact that quotations 308(c) and 308(d) are multiple predecessors of sales order 310 may be deduced. The multiple invoices 308(c) and 308(d) preceding invoice 310 may be used in an analytics reporting context to indicate origination of credit for items appearing on a final sales order 310. That is, using the multiple relations deduced, it may be possible to elicit more accurate analytics reporting functions for DocFlow. In the context shown in FIG. 6, for example, it may be possible to trace the origination of particular items appearing on a sales order to the precise invoices that gave rise to the items. This would otherwise be difficult or impossible in an OLAP system that prohibited multiple predecessor documents to be represented.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A method for determining a multiplicity of predecessor relationships, the method comprising:
    identifying multiple predecessor documents for a single successor document in an online analytical processing (OLAP) system using a data structure from an online transaction processing (OLTP) system including,
    accessing the data structure stored within the OLTP system, wherein the data structure includes a representation of an object tree that includes relational information specifying relationships between objects and sub-objects of the objects and relationships among the sub-objects, the object tree further includes representations of a successor object associated with a first document, successor sub-objects having items of the first document, a first predecessor object associated with a second document, a first predecessor sub-object having an item of the second document, a second predecessor object associated with a third document, a second predecessor sub-object having an item of the third document;
    extracting first relationship information based on the relational information, the first relationship information indicating a first sub-object relationship between the first predecessor object and the first predecessor sub-object and a second sub-object relationship between the second predecessor object and the second predecessor sub-object;
    extracting second relationship information based on the relational information, the second relationship information indicating a third sub-object relationship between the successor object and each of the successor sub-objects; and
    extracting third relationship information based on the relational information, the third relationship information indicating a first predecessor sub-object relationship between at least one successor sub-object and the first predecessor sub-object based on the item of the second document being same as an item of the first document, and a second predecessor sub-object relationship between at least one successor sub-object and the second predecessor sub-object based on the item of the third document being same as an item of the first document;
    deducing a first predecessor relationship between the successor object and the first predecessor object based the first, second, and third relationship information such that the second document is identified as a predecessor of the first document; and
    deducing a second predecessor relationship between the successor object and the second predecessor object based on the first, second, and third relationship information such that the third document is identified as a predecessor of the first document.

2. The method according to claim 1, wherein extracting the first relationship information, extracting the second relationship information, and extracting the third relationship information each further comprise utilizing a data source provided to an extraction system, the data source specifying at least one of an extraction structure and a function module for performing the extracting.

3. The method according to claim 1, further comprising performing analytic functions on the first and second predecessor objects and the successor object using the deduced predecessor relationships.

4. The method according to claim 1, wherein the objects and the sub-objects are associated through the object tree in the OLTP system, the object tree comprising a plurality of tables representing objects and relations.

5. The method according to claim 4, wherein extracting the first relationship information, the second relationship information, and the third relationship information further comprises: reading a first table corresponding to the first relationship information and the second relationship information, and a second table corresponding to the third relationship information.

6. The method according to claim 5, wherein the second table stores a relation between a first item and a second item.

7. The method according to claim 1, wherein the data structure stored within the OLTP system comprises a plurality of tables pairs, each table pair comprising two tables, and representing:
    a relationship between an object and a sub-object and
    a relationship between two or more sub-objects.

8. The method according to claim 7, wherein extracting the first relationship information comprises reading a first table, wherein the first table comprises the first relationship information; and wherein extracting the third relationship information comprises reading a second table, wherein the second table comprises the third relationship information.

9. The method according to claim 1, wherein the data structure stored within the OLTP system comprises information detailing which sub-objects are included by which objects, and the predecessor/successor relationship between pluralities of sub-objects.

10. An apparatus for determining a multiplicity of predecessor relationships, the apparatus comprising:
    a processor, wherein the processor is configured to:
        identify multiple predecessor documents for a single successor document in an online analytical processing (OLAP) system using a data structure from an online transaction processing (OLTP) system including,
        access the data structure stored within the OLTP system, wherein the data structure includes a representation of an object tree that includes relational information specifying relationships between objects and sub-objects of the objects and relationships among the sub-objects, the object tree further includes representations of a successor object associated with a first document, successor sub-objects having items of the first document, a first predecessor object associated with a second document, a first predecessor sub-object having an item of the second document, a second predecessor object associated with a third document, a second predecessor sub-object having an item of the third document;

extract first relationship information based on the relational information, the first relationship information indicating a first sub-object relationship between the first predecessor object and the first predecessor sub-object and a second sub-object relationship between the second predecessor object and the second predecessor sub-object;

extract second relationship information based on the relational information, the second relationship information indicating a third sub-object relationship between the successor object and each of the successor sub-objects;

extract third relationship information based on the relational information, the third relationship information indicating a first predecessor sub-object relationship between at least one successor sub-object and the first predecessor sub-object based on the item of the second document being same as an item of the first document, and a second predecessor sub-object relationship between at least one successor sub-object and the second predecessor sub-object based on the item of the third document being same as an item of the first document;

deduce a first predecessor relationship between the successor object and the first predecessor object based the first, second, and third relationship information such that the second document is identified as a predecessor of the first document; and deduce a second predecessor relationship between the successor object and the second predecessor object based on the first, second, and third relationship information such that the third document is identified as a predecessor of the first document.

11. The apparatus according to claim 10, wherein the processor is configured to extract the first, second, and third relationship information based upon received data, the data source specifying at least one of an extraction structure and a function module for performing an extraction process.

12. The apparatus according to claim 10, wherein the data structure stored within the OLTP system comprises a plurality of tables pairs, each table pair comprising two tables, and representing:
a relationship between an object and a sub-object and
a relationship between two or more sub-objects.

13. A system comprising:
at least one processor;
a non-transitory computer-readable medium storing executable instructions that when executed by the at least one processor are configured to implement,
a relation extractor, the relation extractor configured to:
identify multiple predecessor documents for a single successor document in an online analytical processing (OLAP) system using a data structure from an online transaction processing (OLTP) system including,
access the data structure stored within the OLTP system, wherein the data structure includes a representation of an object tree that includes relational information specifying relationships between objects and sub-objects of the objects and relationships among the sub-objects, the object tree further includes representations of a successor object associated with a first document, successor sub-objects having items of the first document, a first predecessor object associated with a second document, a first predecessor sub-object having an item of the second document, a second predecessor object associated with a third document, a second predecessor sub-object having an item of the third document;

extract first relationship information based on the relational information, the first relationship information indicating a first sub-object relationship between the first predecessor object and the first predecessor sub-object and a second sub-object relationship between the second predecessor object and the second predecessor sub-object;

extract second relationship information based on the relational information, the second relationship information indicating a third sub-object relationship between the successor object and each of the successor sub-objects; and extract third relationship information based on the relational information, the third relationship information indicating a first predecessor sub-object relation between at least one successor sub-object and the first predecessor sub-object based on the item of the second document being same as an item of the first document, and a second predecessor sub-object relationship between at least one successor sub-object and the second predecessor sub-object based on the item of the third document being same as an item of the first document; and a sequence deduction unit, the sequence deduction unit configured to:

deduce a first predecessor relationship between the successor object and the first predecessor object based the first, second, and third relationship information such that the second document is identified as a predecessor of the first document; and deduce a second predecessor relationship between the successor object and the second predecessor object based on the first, second, an third relationship information such that the third document is identified as a predecessor of the first document.

14. The apparatus according to claim 13, wherein extracting the first relationship information comprises reading a first table, wherein the first table comprises the first relationship information; and wherein extracting the third relationship information comprises reading a second table, wherein the second table comprises the third relationship information.

* * * * *